United States Patent
Umemura

(10) Patent No.: US 12,430,781 B2
(45) Date of Patent: Sep. 30, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Naoki Umemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 400 days.

(21) Appl. No.: 17/571,904

(22) Filed: Jan. 10, 2022

(65) Prior Publication Data

US 2022/0230337 A1 Jul. 21, 2022

(30) Foreign Application Priority Data

Jan. 19, 2021 (JP) .................. 2021-006356

(51) Int. Cl.
 G06T 7/55 (2017.01)
 G06T 7/70 (2017.01)
 G06T 7/90 (2017.01)
 H04N 5/222 (2006.01)
 H04N 23/90 (2023.01)

(52) U.S. Cl.
 CPC .............. *G06T 7/55* (2017.01); *G06T 7/70* (2017.01); *G06T 7/90* (2017.01); *H04N 5/2226* (2013.01); *H04N 23/90* (2023.01)

(58) Field of Classification Search
 CPC .... G06T 7/55; G06T 7/70; G06T 7/90; G06T 2207/10012; G06T 2207/30196; G06T 2207/30228; H04N 5/2226; H04N 23/90
 See application file for complete search history.

(56) References Cited

U.S. PATENT DOCUMENTS

| 2020/0098122 A1* | 3/2020 | Dal Mutto | .............. G06T 17/00 |
| 2023/0222817 A1* | 7/2023 | Sun | .......................... G06N 3/08 |
| | | | 382/103 |

FOREIGN PATENT DOCUMENTS

| JP | 2006-64589 A | 3/2006 |
| JP | 2016-005027 A | 1/2016 |
| JP | 2018-056971 A | 4/2018 |
| JP | 2019-161462 A | 9/2019 |
| JP | 2019-197279 A | 11/2019 |

OTHER PUBLICATIONS

WO2019176713 Uno, Google translated, (Year: 2019).*
Notice of Reasons for Refusal issued by the Japanese Patent Office on Oct. 29, 2024 in corresponding JP Patent Application No. 2021-006356, with English translation.

(Continued)

*Primary Examiner* — Jianxun Yang
(74) *Attorney, Agent, or Firm* — Carter, DeLuca & Farrell LLP

(57) ABSTRACT

A plurality of images obtained by image capturing by a plurality of cameras and camera parameters are obtained, whether or not an object of interest exists within a depth of field of each camera is determined based on the camera parameters, and processing relating to shape data representing a three-dimensional shape of the object of interest is performed based on an image of the camera for which it has been determined that the object of interest exists within the depth of field.

8 Claims, 11 Drawing Sheets

(56) References Cited

OTHER PUBLICATIONS

Notice of Reasons for Refusal issued by the Japanese Patent Office on Mar. 18, 2025 in corresponding JP Patent Application No. 2021-006356, with English translation.
Notice of Reasons for Refusal issued by the Japanese Patent Office on Aug. 19, 2025 in corresponding JP Patent Application No. 2021-006356, with English translation.

* cited by examiner

|  | CAMERA 611 | CAMERA 612 | CAMERA 613 | CAMERA 614 | CAMERA 615 | CAMERA 616 | CAMERA 617 | CAMERA 618 |
|---|---|---|---|---|---|---|---|---|
| POINT 601 | 1 | 1 | 1 | 0 | 0 | 0 | 0 | 1 |
| POINT 602 | 1 | 1 | 1 | 1 | 0 | 0 | 0 | 0 |
| POINT 603 | 0 | 1 | 1 | 1 | 1 | 0 | 0 | 0 |
| POINT 604 | 0 | 0 | 1 | 1 | 1 | 1 | 0 | 0 |
| POINT 605 | 0 | 0 | 0 | 1 | 1 | 1 | 1 | 0 |
| POINT 606 | 0 | 0 | 0 | 0 | 1 | 1 | 1 | 1 |
| POINT 607 | 1 | 0 | 0 | 0 | 0 | 1 | 1 | 1 |
| POINT 608 | 1 | 1 | 0 | 0 | 0 | 0 | 1 | 1 |

FIG.7

| | | | POINT 601 | POINT 602 | POINT 603 | POINT 604 | POINT 605 | POINT 606 | POINT 607 | POINT 608 |
|---|---|---|---|---|---|---|---|---|---|---|
| SECOND CAMERA GROUP | 111a | VISIBILITY | 0 | 0 | 0 | 0 | 1 | 1 | 1 | 1 |
| | | DEPTH OF FIELD | 1 | 1 | 1 | 1 | 1 | 1 | 1 | 1 |
| | 111b | VISIBILITY | 1 | 0 | 0 | 0 | 0 | 1 | 1 | 1 |
| | | DEPTH OF FIELD | 1 | 1 | 1 | 1 | 1 | 1 | 1 | 1 |
| | 111c | VISIBILITY | 0 | 0 | 0 | 0 | 0 | 0 | 0 | 0 |
| | | DEPTH OF FIELD | 1 | 1 | 1 | 1 | 1 | 1 | 1 | 1 |
| | 111d | VISIBILITY | 0 | 0 | 0 | 0 | 0 | 0 | 0 | 0 |
| | | DEPTH OF FIELD | 0 | 0 | 0 | 0 | 0 | 0 | 0 | 0 |
| | 111e | VISIBILITY | 0 | 0 | 0 | 0 | 0 | 0 | 0 | 0 |
| | | DEPTH OF FIELD | 0 | 0 | 0 | 0 | 0 | 0 | 0 | 0 |
| | 111f | VISIBILITY | 0 | 0 | 0 | 0 | 0 | 0 | 0 | 0 |
| | | DEPTH OF FIELD | 0 | 0 | 0 | 0 | 0 | 0 | 0 | 0 |
| | 111g | VISIBILITY | 0 | 0 | 0 | 0 | 0 | 0 | 0 | 0 |
| | | DEPTH OF FIELD | 0 | 0 | 0 | 0 | 0 | 0 | 0 | 0 |
| | 111h | VISIBILITY | 0 | 0 | 0 | 0 | 0 | 0 | 0 | 0 |
| | | DEPTH OF FIELD | 0 | 0 | 0 | 0 | 0 | 0 | 0 | 0 |
| | 111i | VISIBILITY | 0 | 1 | 1 | 1 | 1 | 0 | 0 | 0 |
| | | DEPTH OF FIELD | 1 | 1 | 1 | 1 | 1 | 1 | 1 | 1 |
| | 111j | VISIBILITY | 0 | 0 | 0 | 1 | 1 | 1 | 1 | 0 |
| | | DEPTH OF FIELD | 1 | 1 | 1 | 1 | 1 | 1 | 1 | 1 |
| FIRST CAMERA GROUP | 111k | VISIBILITY | 0 | 0 | 0 | 1 | 1 | 1 | 1 | 0 |
| | | DEPTH OF FIELD | 1 | 1 | 1 | 1 | 1 | 1 | 1 | 1 |
| | 111ℓ | VISIBILITY | 1 | 0 | 0 | 0 | 0 | 1 | 1 | 1 |
| | | DEPTH OF FIELD | 1 | 1 | 1 | 1 | 1 | 1 | 1 | 1 |
| | 111m | VISIBILITY | 1 | 1 | 0 | 0 | 0 | 0 | 1 | 1 |
| | | DEPTH OF FIELD | 1 | 1 | 1 | 1 | 1 | 1 | 1 | 1 |
| | 111n | VISIBILITY | 1 | 1 | 0 | 0 | 0 | 0 | 1 | 1 |
| | | DEPTH OF FIELD | 1 | 1 | 1 | 1 | 1 | 1 | 1 | 1 |
| | 111o | VISIBILITY | 1 | 1 | 1 | 0 | 0 | 0 | 0 | 1 |
| | | DEPTH OF FIELD | 1 | 1 | 1 | 1 | 1 | 1 | 1 | 1 |
| | 111p | VISIBILITY | 1 | 1 | 1 | 1 | 0 | 0 | 0 | 0 |
| | | DEPTH OF FIELD | 1 | 1 | 1 | 1 | 1 | 1 | 1 | 1 |
| | 111q | VISIBILITY | 0 | 1 | 1 | 1 | 1 | 0 | 0 | 0 |
| | | DEPTH OF FIELD | 1 | 1 | 1 | 1 | 1 | 1 | 1 | 1 |
| | 111r | VISIBILITY | 0 | 1 | 1 | 1 | 1 | 0 | 0 | 0 |
| | | DEPTH OF FIELD | 1 | 1 | 1 | 1 | 1 | 1 | 1 | 1 |
| | 111s | VISIBILITY | 0 | 0 | 0 | 1 | 1 | 1 | 1 | 0 |
| | | DEPTH OF FIELD | 1 | 1 | 1 | 1 | 1 | 1 | 1 | 1 |
| | 111t | VISIBILITY | 0 | 0 | 1 | 1 | 1 | 1 | 0 | 0 |
| | | DEPTH OF FIELD | 1 | 1 | 1 | 1 | 1 | 1 | 1 | 1 |

FIG.10

INFORMATION PROCESSING APPARATUS, INFORMATION PROCESSING METHOD, AND STORAGE MEDIUM

BACKGROUND

Field

The technique of the present disclosure relates to a technique to perform processing relating to a three-dimensional model based on captured images of a plurality of imaging devices.

Description of the Related Art

Recently, a technique has been attracting attention, which generates a virtual viewpoint image representing an appearance from a designated viewpoint (virtual viewpoint) by performing synchronous image capturing at multiple viewpoints by installing a plurality of imaging devices at different positions and using a plurality of images obtained by the image capturing. At the time of generating a virtual viewpoint image, an image in a case where an image capturing-target area is seen from a virtual viewpoint is created by finding shape data representing a three-dimensional shape of an object, such as a person, which exists in the image capturing-target area. There are various generation targets of the virtual viewpoint image and for example, there is a sports event that takes place in a stadium. For example, in a case of soccer, a plurality of imaging devices is arranged so as to surround the periphery of a field. Japanese Patent Laid-Open No. 2019-161462 has disclosed a technique to control the focus position so that each of a plurality of cameras includes the entire range on the field on which a player or the like can move within the depth of field.

However, there is a case where it is desired to enlarge and capture a portion of an object, for example, such as the expression of a player, with a high resolution. In this case, among captured images obtained by a plurality of imaging devices, a captured image in which the object is captured in the state of being outside the depth of field is included. In a case where the captured image in which the object is outside the depth of field is used for generation or the like of shape data representing a three-dimensional shape, appropriate processing is no longer performed.

SUMMARY

The information processing apparatus obtains a plurality of images captured by a plurality of imaging devices and parameters for specifying positions and orientations of the plurality of imaging devices; determines whether or not a specific object exists within a depth of field of an imaging device of the plurality of imaging devices based on the parameters; and performs processing relating to shape data representing a three-dimensional shape of the specific object based on an image of the imaging device for which it has been determined that the specific object exists within the depth of field by the determination among the plurality of imaging devices.

Further features of the present disclosure will become apparent from the following description of exemplary embodiments with reference to the attached drawings.

BRIEF DESCRIPTION OF THE DRAWINGS

FIG. 7 is a table showing results of visibility determination;

FIG. 8 is a diagram showing a relationship between FIGS. 8A and 8B:

FIG. 10 is a table that puts together results of visibility determination and results of depth of field determination.

DESCRIPTION OF THE EMBODIMENTS

Hereinafter, with reference to the attached drawings, the present disclosure is explained in detail in accordance with the preferred embodiments. Configurations shown in the following embodiments are merely exemplary and the present disclosure is not limited to the configurations shown schematically.

First Embodiment

<Basic System Configuration>

Figure 1:
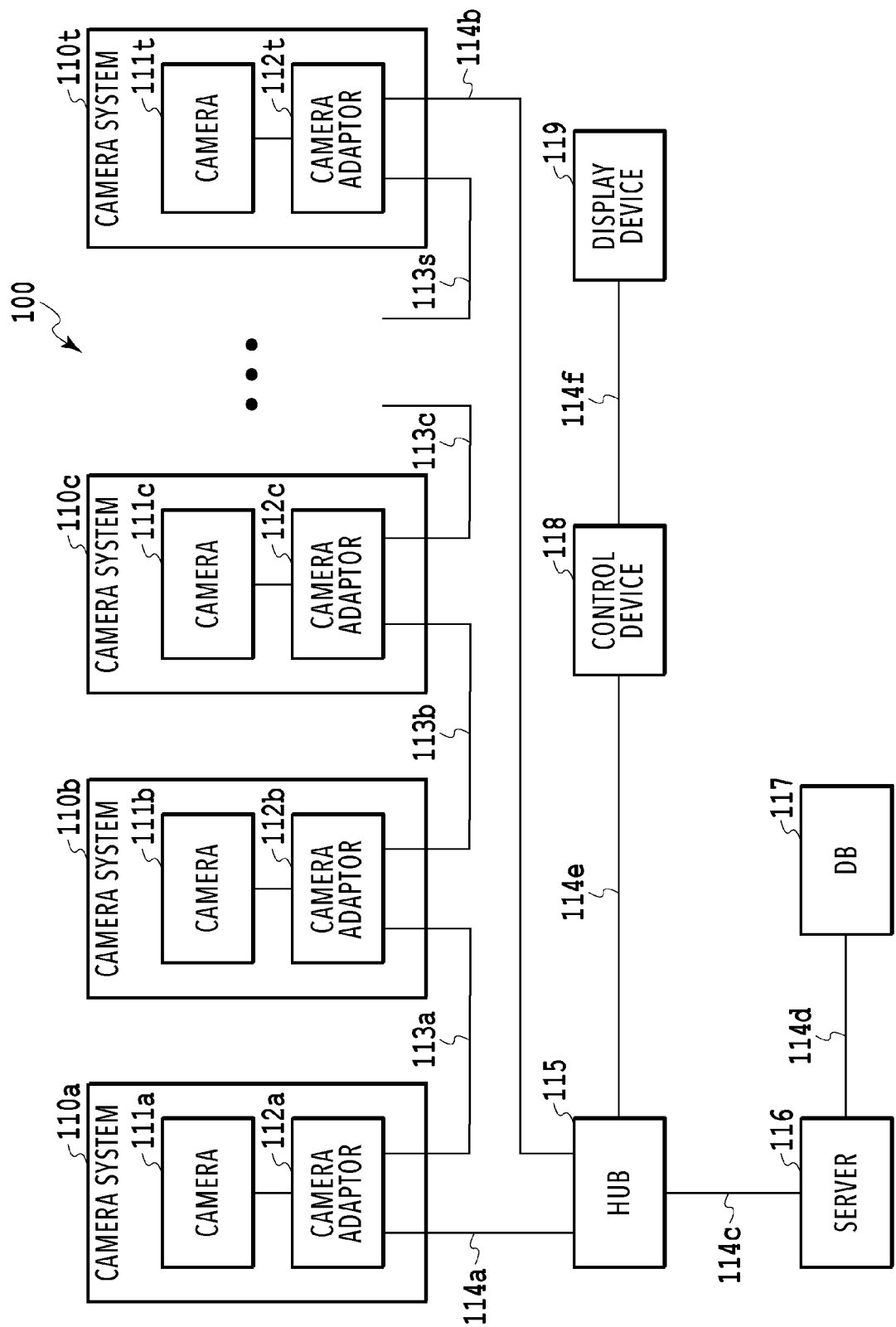
FIG. 1 is a block diagram showing an example of a configuration of an image processing system that generates a virtual viewpoint image.

FIG. 1 is a block diagram showing an example of the configuration of an image processing system that generates a virtual viewpoint image according to the present embodiment. An image processing system 100 has a plurality of camera systems 110a to 110t, a switching hub (HUB) 115, a server 116, a database (DB) 117, a control device 118, and a display device 119. In FIG. 1, within each camera system 110, each of cameras 111a to 111t and each of camera adaptors 112a to 112t exist being connected by an internal wire. Then, the adjacent camera systems are connected to each other by each of network cables 113a to 113s. That is, each camera system 110 performs transmission with daisy-chain connection by the network cable. The switching hub 115 performs routing between each network device. The server 116 is an information processing apparatus that performs processing, such as modification of a captured image transmitted from the camera system 110, generation of a three-dimensional model of an object, and coloring (rendering) of a three-dimensional model. Further, the server 116 also has a time server function to generate a time synchronization signal for performing time synchronization of the present system. Each camera 111 performs image capturing for each frame in high-accurate synchronization with one another based on the synchronization signal. The database 117 is an information processing apparatus that accumulates data of the captured image modified by the server 116 and the generated three-dimensional model, sends the accumulated data to the server 116, and so on. The control device 118 is an information processing apparatus that controls each camera system 110 and the server 116. Further, the control device 118 is also utilized for setting of a virtual camera (virtual viewpoint). The display device 119 displays a setting user interface screen (UI screen) for a user to designate a virtual viewpoint in the control device 118, displays a UI screen for browsing a generated virtual viewpoint image, and so on. The display device 119 is, for example, a television, a monitor of a computer, a liquid crystal display unit of a tablet or a smartphone, and the like and it does not matter what type it is.

The switching hub 115 and the camera systems 110a and 110t are connected by network cables 114a and 114b, respectively. Similarly, the switching hub 115 and the server 116 are connected by a network cable 114c and further, the server 116 and the database 117 are connected by a network cable 114d. Then, the switching hub 115 and the control device 118 are connected by a network cable 114e and further, the control device 118 and the display device 119 are connected by an image cable 114f.

In the example in FIG. 1, the cameral systems 110a to 110t are configured by the daisy chain connection, but the star connection in which the switching hub 115 and each camera system 110 are connected directly may be accepted. Further, in the example in FIG. 1, the 20 camera systems 110 configure the image processing system 100, but this is a mere example. The actual number of camera systems is determined by taking into consideration the size of the image capturing space, the contents of the target event, the number of supposed objects, the desired image quality and the like.

Here, a rough flow of virtual viewpoint image generation in the image processing system 100 is explained. The image captured by the camera 111a is transmitted to the camera adaptor 112b of the camera system 110b through the network cable 113a after image processing, such as separating the object, which is taken as the foreground, and the background, has been performed in the camera adaptor 112a for the image. Similarly, the camera system 110b transmits the image captured by the camera 11b to the camera system 110c together with the captured image received from the camera system 110a. By continuing the operation such as this, the captured images captured by each of the cameras 111a to 111t of the camera systems 110a to 110t are transmitted from the camera system 110t to the switching hub 115 via the network cable 114b and then transmitted to the server 116.

In the present embodiment, the server 116 performs both generation of a three-dimensional model and generation of a virtual viewpoint image, but the system configuration is not limited to this. For example, a server that performs generation of a three-dimensional model and a server that performs generation of a virtual viewpoint image may exist separately.

<Camera Arrangement>

Figure 2:
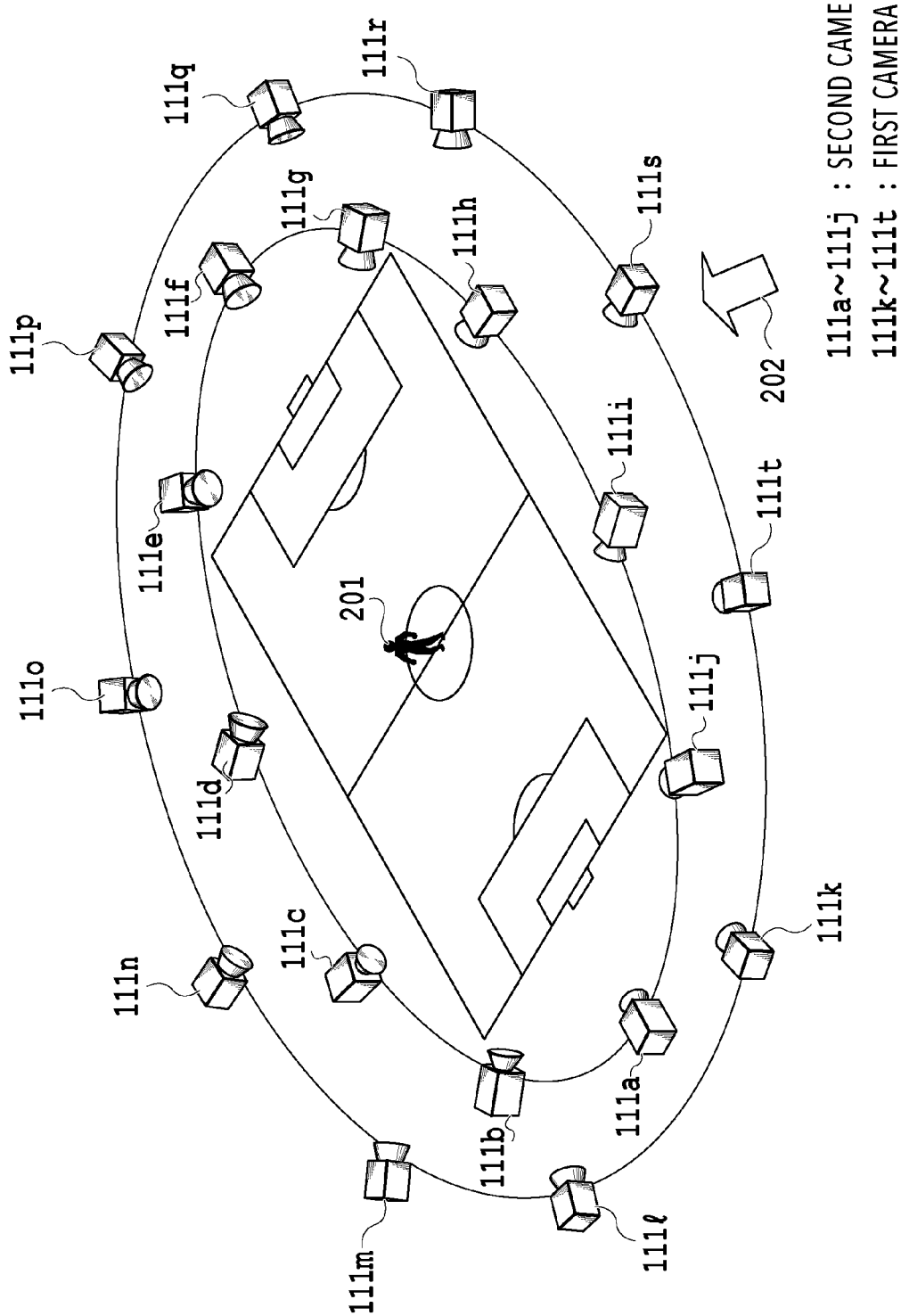
FIG. 2 is a schematic diagram showing the way cameras (imaging devices) are arranged in a bird's-eye view.

FIG. 2 is a schematic diagram showing the way the 20 cameras 111a to 111t in the image processing system 100 described above are arranged around a field on which soccer is played in a bird's-eye view. In the present embodiment, the 20 cameras 111a to 111t are divided into a first camera group (first imaging device group) and a second camera group (second imaging device group). The first camera group includes the ten cameras 111k to 111t that capture the entire field from a relatively distant position. On the other hand, the second camera group includes the ten cameras 111a to 111j that capture a specific area within the field from a relatively near position. Then, it is assumed that the ten cameras 111k to 111t belonging to the first camera group whose image capturing distance (distance from the camera to an object) is long face the field center. Further, it is assumed that the five cameras of the ten cameras 111a to 111j belonging to the second camera group whose image capturing distance is short face in a direction different from another direction in which the other five cameras face. That is, the cameras 111a, 111b, 111c, 111i, and 111j face the position in the vicinity of the goal front on the left side of the field and the cameras 111d, 111e, 111f, 111g, and 111h face the position in the vicinity of the goal front on the right side of the field. In general, the image capturing distance and the depth of field are in a correlation with each other and the longer the image capturing distance, the longer the depth of field is. Consequently, the cameras 111k to 111t belonging to the first camera group have a depth of field wider (deeper) than that of the cameras 111a to 111i belonging to the second camera group. Then, by the image capturing area in the charge of the cameras 111a to 111j belonging to the second camera group being captured from many directions by a sufficient number of cameras, it is made possible to generate a virtual viewpoint image with a higher image quality. In this case, it is assumed that the position of each camera belonging to both the camera groups is specified by coordinate values of three-dimensional coordinates with an arbitrary one point on the field being taken as the origin. The cameras belonging to each camera group may have the same height or may have different heights.

Figure 3:
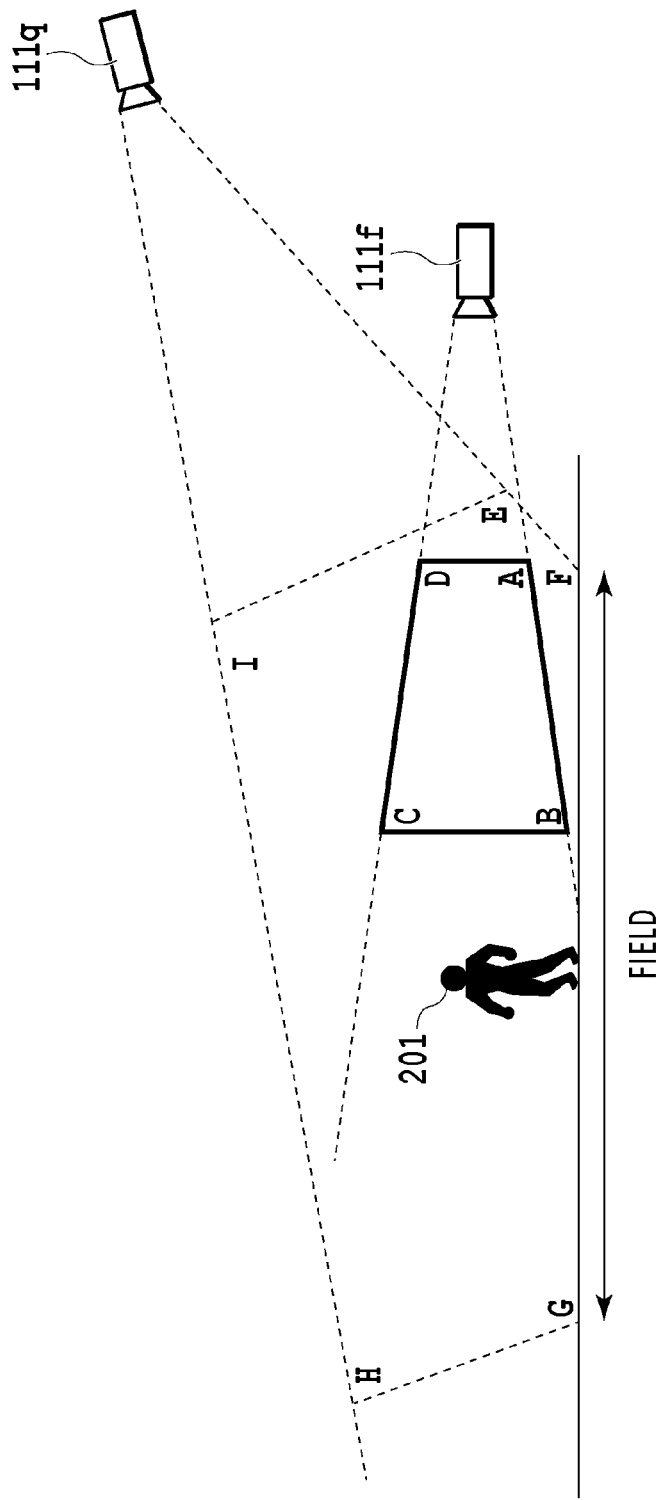
FIG. 3 is a schematic diagram in a case where an object of a player is seen from a side.

It is assumed that the camera parameters of each of the cameras 111k to 111t configuring the first camera group are set so as to include the entire field (the entire three-dimensional space including the height direction) within the depth of field thereof. That is, in the captured image of each of the cameras 111k to 111t, players who play on the field and the like are always captured in the focused state. On the other hand, it is assumed that the camera parameters of each of the cameras 111a to 111j configuring the second camera group are set so that a predetermined range with the position in the vicinity of the goal front on one side of the field being taken as the center is included within the depth of field thereof. That is, for each of the cameras 111a to 111j, in a case where a player or the like is included within a predetermined range, a high-definition captured image with a high image quality is obtained, but the depth of field thereof is narrow (shallow). Because of this, for each of the cameras 111a to 111j, there is a case where an area on the field exists, which is outside the depth of field even though it is within the viewing angle, and therefore, the captured player is out of focus. FIG. 3 is a schematic diagram in a case where a player 201 within the center circle in FIG. 2 is seen from the direction of an arrow 202 (side). Here, in order to explain the difference in the depth of field between the two camera groups, only the camera 111q belonging to the first camera group and the camera 111f belonging to the second camera group are shown. Here, for the camera 111f, the area indicate by a trapezoid ABCD represents the depth of field in a case where image capturing is performed with this camera. That is, in a case of the camera 111f, the area before a segment AD seen from the camera and the area on the side deeper than a segment BC are outside the depth of field. As a result of that, the player 201 existing on the side deeper than the segment BC is out of focus in the captured image or the original color of the object cannot be obtained. Similarly, the depth of field of the camera 111q is indicated by a pentagon EFGHI. In a case of the camera 111q, the area before a segment EI seen from the camera and the area on the side deeper than a segment GH are outside the depth of field. The segment AD and the segment EI in FIG. 3 are called "front depth of field" and the segment BC and the segment GH are called "rear depth of field". From FIG. 3 it can be seen that the player 201 exists outside the depth of field of the camera 111f and exists within the depth of field of the camera 111q.

In the present embodiment, for convenience of explanation, it is assumed that all the ten cameras in the first camera group perform image capturing with the same gaze point and in the second camera group, the five cameras perform image capturing with a gaze point and the other five cameras with another gaze point, but the present embodiment is not limited to this. For example, it may also be possible to divide the first camera group whose image capturing distance is long into a plurality of groups and cause each group to perform image capturing with a gaze point different for each group. Further, it may also be possible to divide the second camera group whose image capturing distance is short into three or more groups and cause each group to perform image capturing with a gaze point different for each group. Further, it may also be possible to cause the ten cameras 111a to 111j belonging to the second camera group to face positions or areas different from one another, or to cause several cameras of the ten cameras to face the same position or the same area. Further, it may also be possible to cause the ten cameras 111k to 111t belonging to the first camera group to face positions or areas different from one another, or to cause several cameras of the ten cameras to face the same position or the same area. Furthermore, it may also be possible to provide three or more camera groups whose image capturing distances are different (that is, the depths of field are different).

<Hardware Configuration>

Figure 4:
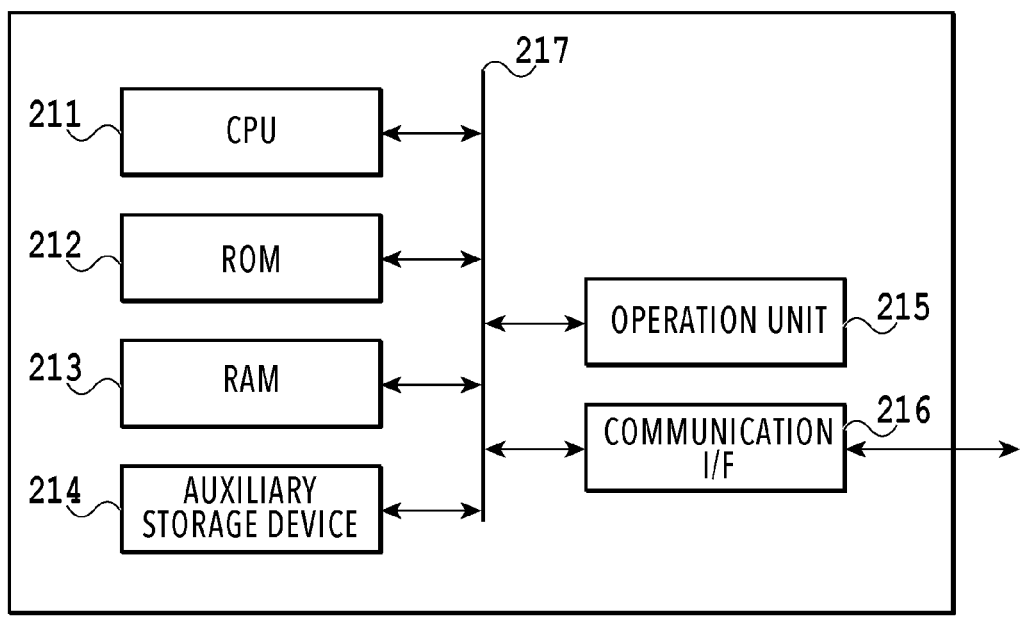
FIG. 4 is a block diagram showing a hardware configuration of an information processing apparatus.

FIG. 4 is a block diagram showing the hardware configuration of the information processing apparatus, such as the server 116 and the control device 118. The information processing apparatus has a CPU 211, a ROM 212, a RAM 213, an auxiliary storage device 214, an operation unit 215, a communication I/F 216, and a bus 217.

The CPU 211 implements each function of the information processing apparatus by controlling the entire information processing apparatus by using computer programs and data stored in the ROM 212 or the RAM 213. The information processing apparatus may have one piece or a plurality of pieces of dedicated hardware or a GUP (Graphics Processing Unit) different from the CPU 211. Then, it may also be possible to cause the GPU or the dedicated hardware to perform at least part of the processing by the CPU 211. As the example of the dedicated hardware, there are an ASIC (Application Specific Integrated Circuit), an FPGA (Field Programmable Gate Array), a DSP (Digital Signal Processor) and the like. The ROM 212 stores programs and the like that do not need to be changed. The RAM 213 temporarily stores programs and data supplied from the auxiliary storage device 214 and data and the like supplied from the outside via the communication i/F 217. The auxiliary storage device 214 includes, for example, a hard disk drive and the like and stores various kinds of data, such as image data and voice data. The operation unit 215 has a display device including a liquid crystal display, an LED and the like, and an input device including a keyboard, a mouse and the like and inputs various user instructions to the CPU 211 via a graphical user interface (GUI) and the like. The operation unit 215 may be a touch panel having the functions of both the display device and the input device. The communication I/F 216 is used for communication with an external device of the information processing apparatus. For example, in a case where the information processing apparatus is connected with an external device by wire, a communication cable is connected to the communication I/F 216. In a case where the information processing apparatus has the function to communicate with an external device, the communication I/F 216 comprises an antenna. The bus 217 connects each unit of the information processing apparatus and transmits information.

<Software Configuration>

Figure 5:
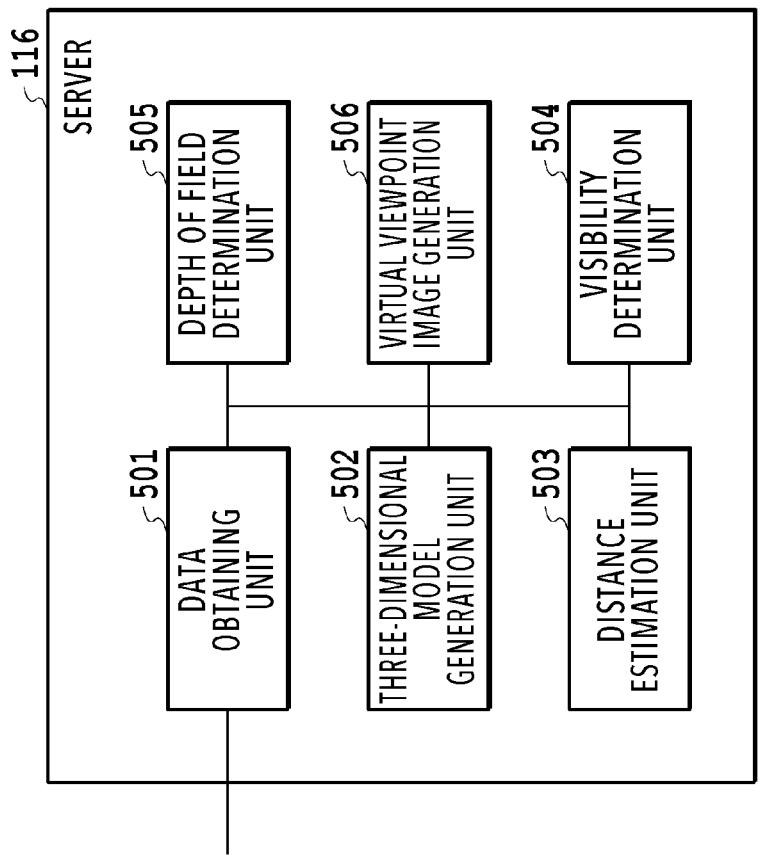
FIG. 5 is a block diagram showing a software configuration of a server that performs generation of a virtual viewpoint image.

FIG. 5 is a block diagram showing the software configuration of the server 116 that performs generation of a virtual viewpoint image based on captured images obtained by the first camera group and the second camera group. The server 116 has a data obtaining unit 501, a three-dimensional model generation unit 502, a distance estimation unit 503, a visibility determination unit 504, a depth of field determination unit 505, and a virtual viewpoint image generation unit 506. In the following, the function of each unit is explained.

The data obtaining unit 501 obtains parameters (camera parameters) specifying image capturing conditions, such as position, orientation, viewing angle, focal length, and aperture value of each camera belonging to the first camera group and the second camera group, and captured image data obtained by each camera via the switching hub 115. Further, the data obtaining unit 501 obtains the information relating to the virtual viewpoint set by the control device 118 (specifically, position, orientation, viewing angle and the like of the virtual viewpoint (in the following, described as "virtual viewpoint information")) via the switching hub 115.

The three-dimensional model generation unit 502 generates a three-dimensional model of an object, such as a player and a ball on the field, based on the camera parameters and the captured image data of each camera, which are received from the data obtaining unit 501. Here, a specific generation procedure is explained briefly. First, by performing foreground/background separation processing for each captured image and a foreground image representing a silhouette of an object is generated. Here, the background difference method is used as the method of foreground/background separation. In the background difference method, first, frames different in the time series in the captured image are compared and the portion whose difference in the pixel value is small is specified as a pixel that does not move and by using the specified pixel that does not move, a background image is generated. Then, by comparing the obtained background image and the frame of interest of the captured image, the pixel whose difference from the background is large in the frame is specified as the pixel that constitutes a foreground and a foreground image is generated. The above processing is performed for each captured image. Next, by using a plurality of foreground images corresponding to each captured image, a three-dimensional model is extracted by the visual hull method (for example, Shape from silhouette method). In the visual hull method, the target three-dimensional space is divided into fine unit cubes (voxels), the pixel position in a case where each voxel is captured in a plurality of captured images is found by three-dimensional calculation, and whether or not each voxel corresponds to the pixel of the foreground is determined. In a case where a voxel is determined to be the pixel of the foreground in all the captured images, the voxel is specified as the voxel constituting the object in the target three-dimensional space. Only the voxels specified as described above are left and the other voxels are deleted. Then, a group of the voxels that remain finally (a set of points having three-dimensional coordinates) is a model (three-dimensional shape data) representing the three-dimensional shape of the object existing in the target three-dimensional space.

The distance estimation unit 503 estimates the distance between the point (voxel) constituting the three-dimensional model and the image capturing surface of each camera by using the camera parameters input from the data obtaining unit 501 for each three-dimensional model generated by the three-dimensional model generation unit 502. Here, a specific estimation procedure is explained briefly. First, the coordinates (world coordinates) of an arbitrary point of the target three-dimensional model are converted into the camera coordinate system by multiplying an external matrix representing the position and orientation of the target camera. The z-value in a case where the position of the target camera is taken to be the origin and the direction toward which the lens faces is taken to be positive on the z-axis of the camera coordinate system is the distance in a case where the arbitrary point is seen from the target camera, and therefore, by performing this for all the points of the target three-dimensional model, the distance from each point to the target camera is obtained. By performing this processing for each camera, the distance information indicating the distance from the target three-dimensional model to each camera is obtained.

Figure 6A:
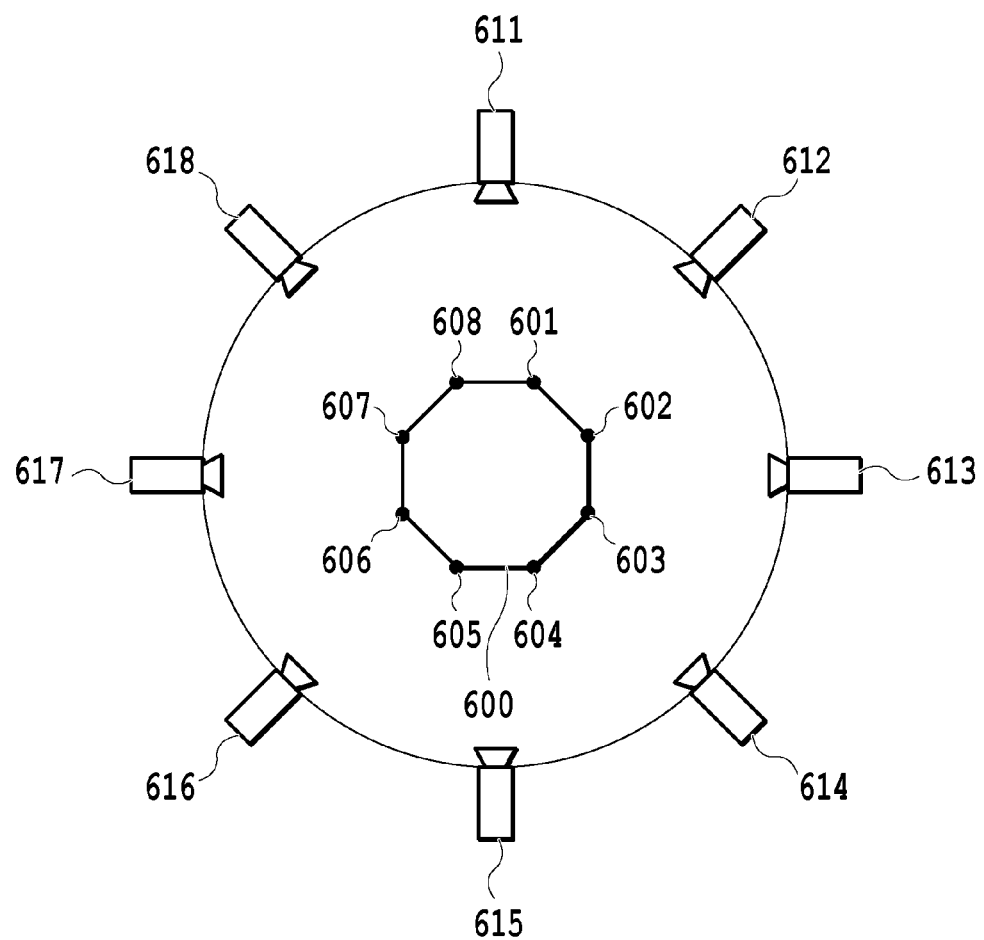
FIG. 6A and FIG. 6B are diagrams explaining visibility determination.
Figure 6B:
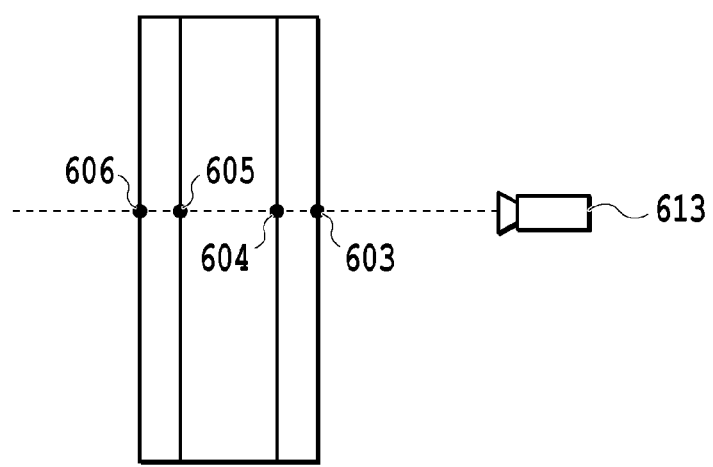

The visibility determination unit 504 determines, for each voxel, whether or not the model representing the three-dimensional shape is seen from each camera by using the distance information obtained by the distance estimation unit 503 for each object for which the three-dimensional model has been generated. Here, a specific procedure of visibility determination is explained with reference to the diagrams. FIG. 6A is a schematic view in a case where the way an object 600 schematically representing a person by a regular prism whose bottom is a regular octagon is captured by eight cameras 611 to 618 installed at regular intervals is seen from directly above. Here, the eight cameras 611 to 618 are located at the same distance from the center point of the object 600 and at the same height. Then, eight points 601 to 608 indicate portions (representative points) at which the height of each of the cameras 611 to 618 at the joint of the side surfaces constituting the object 600 is the same. FIG. 6B is a schematic diagram in a case where a relationship between the camera 613, among the above-described eight cameras 611 to 618, and the object 600 is seen from the side. It is assumed that the object 600 has a sufficient height so that there is a representative point ahead of the line of sight of each camera. Further, it is assumed that the line-of-sight direction of each of the cameras 611 to 618 is the direction toward the center point of the object 600 and each camera is installed in parallel to the ground surface. FIG. 7 is a table showing whether or not the representative points 601 to 608 are captured (seen) in the captured image of each camera in a case where the object 600 is captured by the eight cameras 611 to 618. In the table in FIG. 17, in the portion at which the row and the column intersect, a value of "1" or "0" is input and "1" means that the specific representative point is seen from the specific camera (visible) and "0" means that the specific representative point is not seen (invisible). In the actual visibility determination, first, the target camera is taken as a reference and the distance to the point (voxel) of interest of the three-dimensional model of the determination-target object and the distance to the center coordinates of the object, which is already known in advance, are compared. Then, in a case where the distance to the point of interest is shorter than the distance to the center coordinates of the object (that is, in a case where the point of interest is closer to the target camera), the point is determined to be visible and in other cases, the point is determined to be invisible.

The depth of field determination unit 505 determines whether or not each object for which the three-dimensional model has been generated is included within the depth of field of each camera belonging to the first camera group and the second camera group. For this determination, the captured image data and the camera parameters of each camera, which are provided from the data obtaining unit 501, and the distance information obtained by the distance estimation unit 503 are used. Specifically, the procedure is as follows. First, by the distance information described previously, the distance (coordinate values representing the position of the object in the image capturing space) from each object to each camera is known for each object. Consequently, from the camera parameters of the target camera, the front depth of field and the rear depth of field are found by calculation and whether or not the position (for example, the center coordinates) of the target object within the captured image is included between the front depth of field and the rear depth of field, which are found, is determined. By performing this for each camera for all the objects captured in the captured image, whether each object is included within the depth of field of each camera is known.

The virtual viewpoint image generation unit 506 generates an image representing an appearance from a virtual viewpoint by performing coloring (rendering processing) for the three-dimensional model of each object based on the virtual viewpoint information that is input from the data obtaining unit 501. At that time, the determination results of the depth of field determination unit 505 and the determination results of the visibility determination unit 504 are referred to.

<Generation Processing of Virtual Viewpoint Image>

Figure 8A:
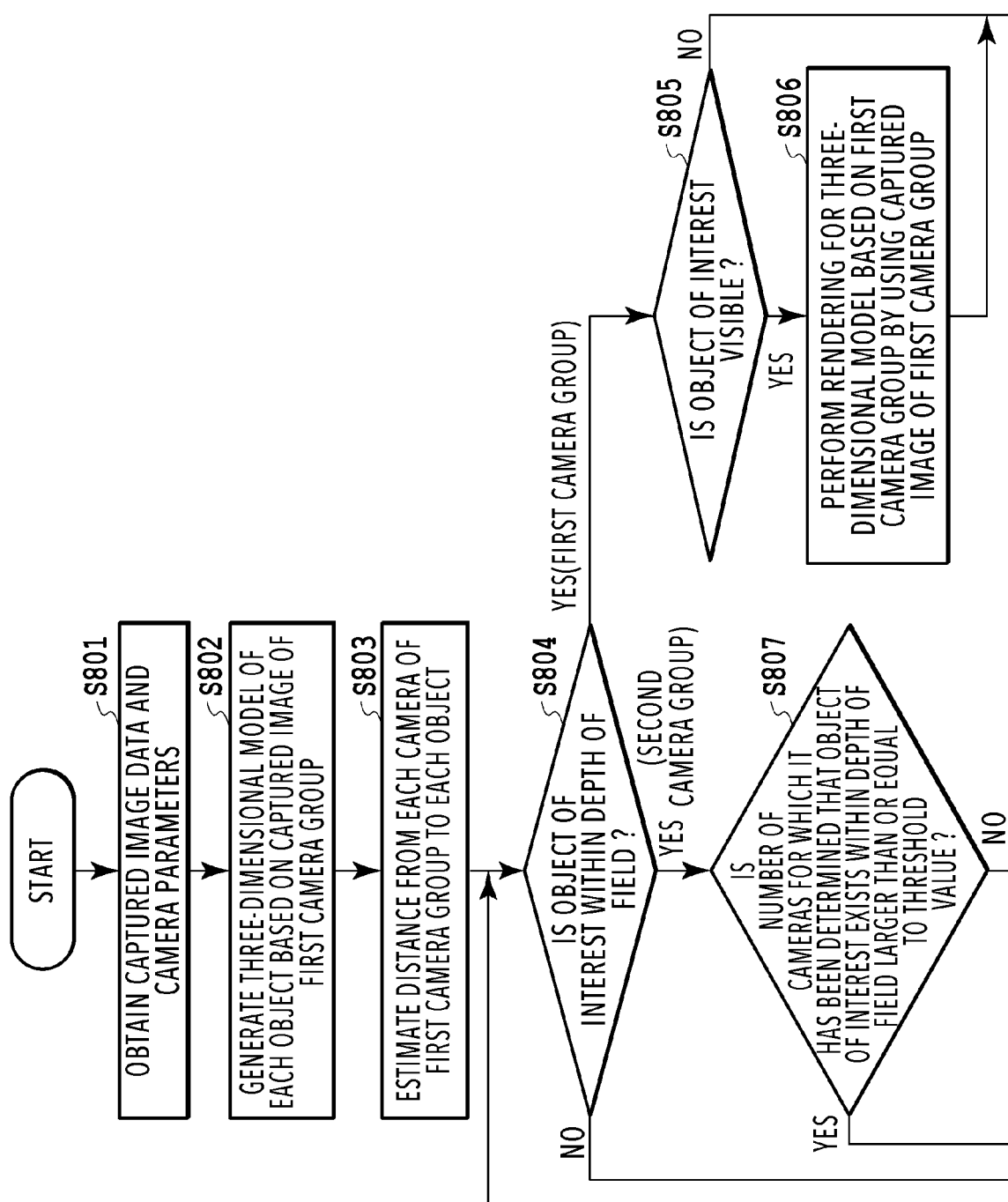
FIGS. 8A and 8B are flowcharts showing a flow of virtual viewpoint image generation processing.
Figure 8B:
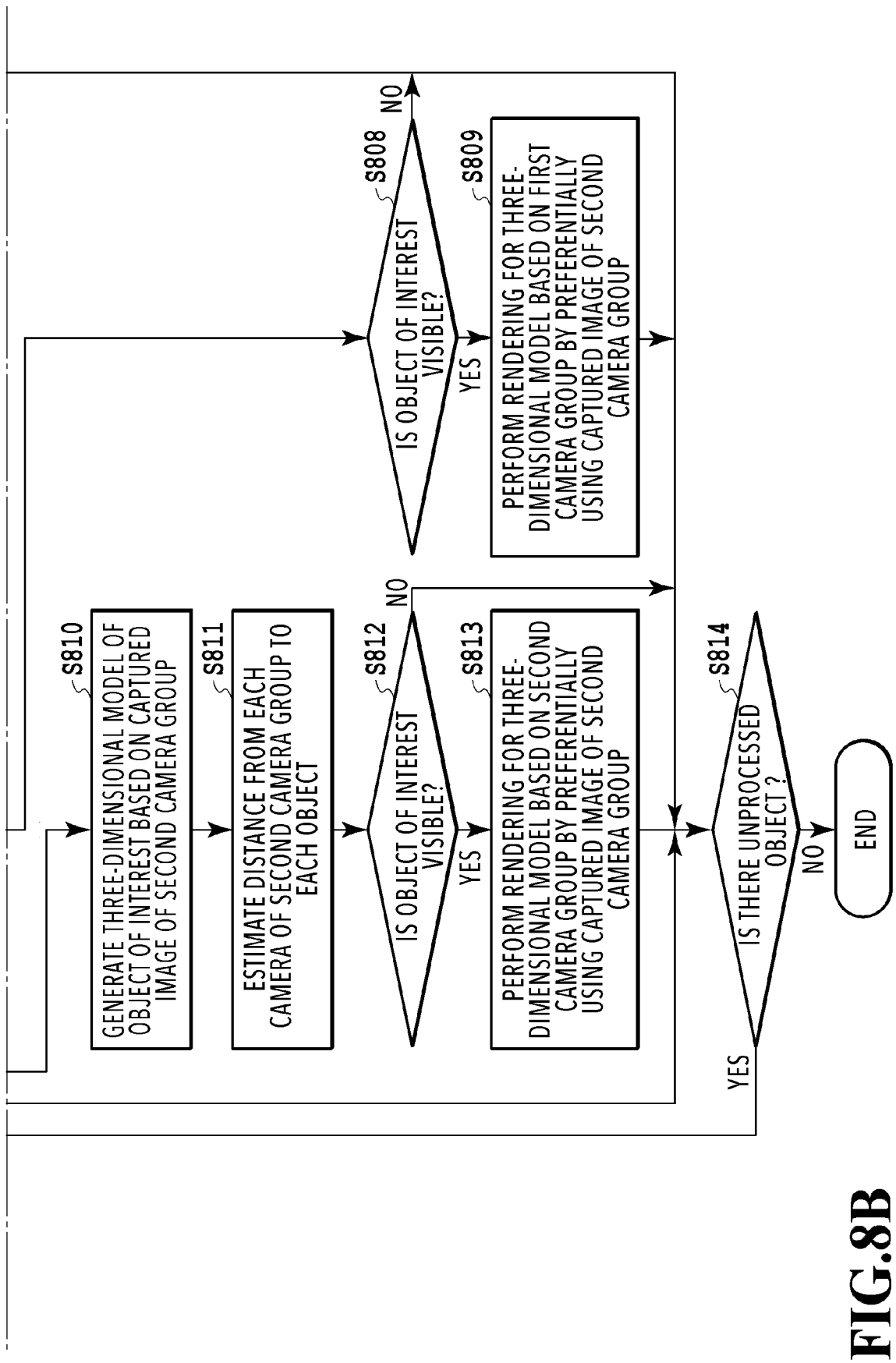

FIGS. 8A and 8B are flowcharts showing the flow of virtual viewpoint image generation processing in the server 116. It is assumed that the series of processing shown in the flowcharts in FIGS. 8A and 8B are started in response to the reception of user instructions (signal giving instructions to generate virtual viewpoint image) including the virtual viewpoint information from the control device 118 and performed for each frame (in a case where the captured image is a moving image). In the following explanation, symbol "S" means a step.

At S801, the data obtaining unit 501 obtains the captured image data obtained by the first camera group and the second camera group performing synchronous image capturing and the camera parameters of each of the cameras 111a to 111t belonging to both the camera groups.

At S802, the three-dimensional model generation unit 502 generates a three-dimensional model of an object, such as a player and a ball, based on the capture image data of the first camera group whose image capturing distance is long and the camera parameters of each camera belonging to the first camera group. In this stage, the captured images of the cameras whose image capturing distance is long are used, and therefore, the accuracy of the three-dimensional model that is obtained is relatively low.

At S803, the distance estimation unit 503 generates the distance information described above by estimating the distance from each point constituting the three-dimensional model to each of the cameras 111k to 111t belonging to the first camera group for the three-dimensional model of each object generated at S802. The processing at next S804 and subsequent steps is performed for each object.

Figure 9:
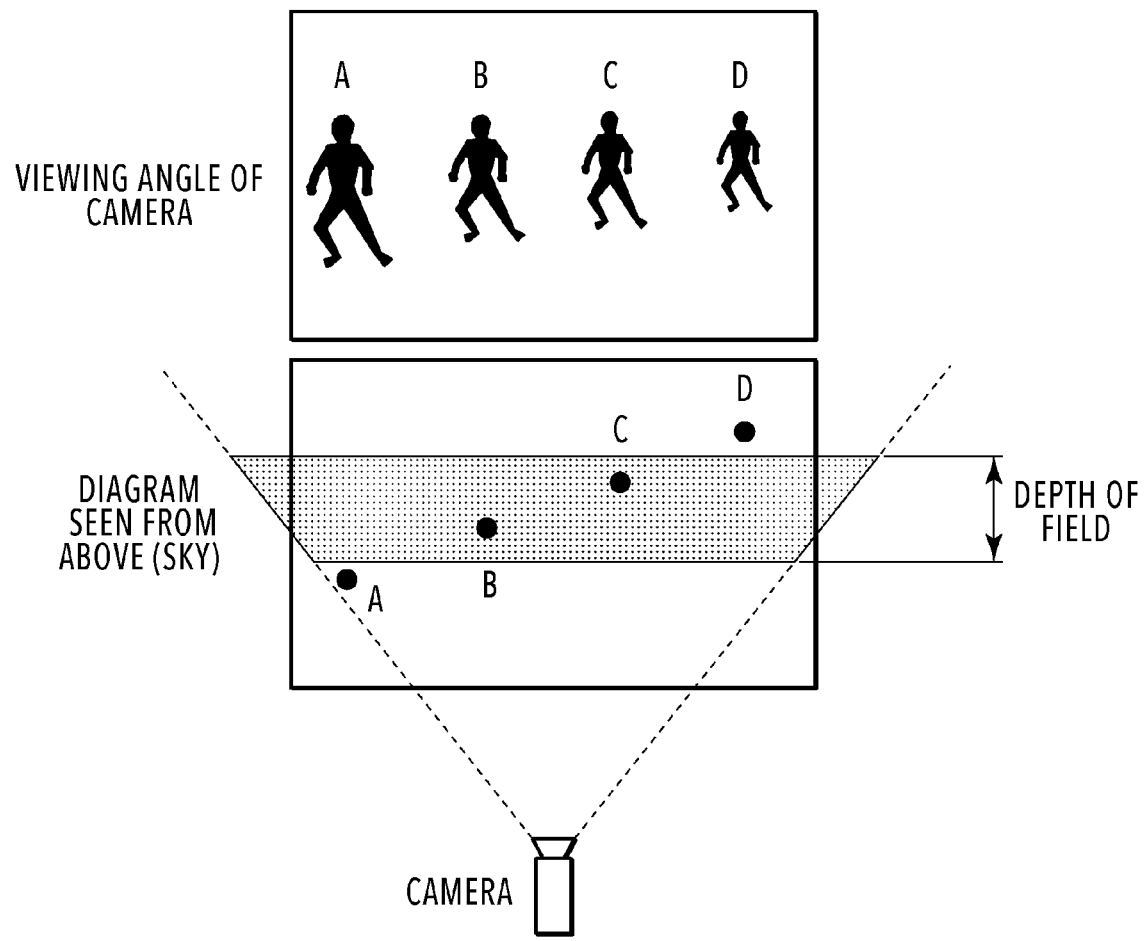
FIG. 9 is a schematic diagram showing a relationship between the viewing angle and the depth of field of a camera.

At S804, the depth of field determination unit 505 determines whether or not the object of interest exists within the depth of field of each of the cameras 111a to 111t belonging to the first and second camera groups based on the results of the distance estimation obtained at S803. FIG. 9 is a schematic diagram showing a relationship between the viewing angle and the depth of field of the camera. For example, in a sports game that is played by a large number of persons, such as soccer and rugby, the possibility is strong that a plurality of players (in this example, objects A to D) is included within the viewing angle of each camera as shown in FIG. 9. However, even though a plurality of players is captured by a certain camera, this does not necessarily mean that all the players are captured with a high image quality and a high accuracy. That is, as shown in FIG. 9, in a state where a plurality of players is included within the viewing angle of the camera, there may be players (objects B and C) existing within the depth of field and players (objects A and D) existing outside the depth of field in a mixed manner. In particular, in the camera whose image capturing distance is short (that is, the depth of field is narrow), which belongs to the second camera group, the captured image such as this is likely to be obtained. Consequently, at this step, whether each object is included within the depth of field of each camera belonging to the first and second camera groups is determined based on the front depth of field and the rear depth of field that are found from the camera parameters and the results of the distance estimation at S803. Here, each of the cameras 111a to 111j of the first camera group has the wide depth of field that covers the entire field, and therefore, the player and the ball on the field are always included within the depth of field. Further, the player and the ball located in the vicinity of the goal front on one of the sides are also included within the depth of field of each of the cameras 111k to 111t of the second camera group. Then, most of the objects existing outside the field, such as the manager, the reserve players, and the spectators, are determined not to exist within the depth of field. Then, in accordance with the determination results, the processing is branched as follows. First, in a case where the object of interest is not included within the depth of field of any camera, the processing advances to S814 to process the next object. In a case where the object of interest is included only within the depth of field of the camera of the first camera group, the processing advances to S805 and in a case where the object of interest is included within the depth of field of the camera of the second camera group, in addition to the first camera group, the processing advances to S807.

At S805, the visibility determination unit 504 determines the visibility in a case where the three-dimensional model of the object of interest is seen from each camera belonging to the first camera group. In a case where the determination results indicate that the three-dimensional model of the object of interest is visible, the processing advances to S806. On the other hand, in a case where the three-dimensional model of the object of interest is not visible, rendering is not necessary for the object, and therefore, the processing advances to S814 to process the next object.

At S806, the virtual viewpoint image generation unit 506 performs rendering processing to color the three-dimensional model of the object of interest, which is generated at S802, based on the virtual viewpoint information provided from the control device 118. Specifically, for each point in the point cloud constituting the three-dimensional model based on the first camera group, which is determined to be visible, processing (rendering) to color the point by using the captured image of the camera of the first camera group, which includes the object of interest within the depth of field thereof, is performed. At S806, it may also be possible to perform processing to determine which camera whose captured image is used to determine the color of the object of interest and perform rendering thereafter. That is, it is determined that the captured image that is used to determine the color of the object of interest is taken as the captured image of the camera of the first camera group, which includes the object of interest within the depth of field.

At S807, the processing is branched in accordance with whether or not the camera belonging to the second camera group, for which it has been determined that the object of interest exists within the depth of field at S804, satisfies a predetermined condition. As the predetermined condition in this case is, for example, that the total number of cameras belonging to the second camera group, for which it has been determined that the object of interest exists within the depth of field, is larger than or equal to a predetermined number and as the predetermined number (threshold value) in this case, it is sufficient for a user to set in advance the number of captured images enough to generate a three-dimensional model at next S810. Further, in addition to the total number of cameras, it may also be possible to add a condition that the object can be captured in a number of image capturing directions (for example, four directions of the object, from the front, from the back, from the right side, and from the left side) larger than or equal to a predetermined number. In a case where the determination results indicate that the number of cameras of the second camera group, for which it has been determined that the object of interest exists within the depth of field, is larger than or equal to the predetermined number, the processing advances to S810 and in a case where the number is less than the predetermined number, the processing advances to S808.

At S808, the visibility determination unit 504 determines the visibility of the three-dimensional model of the object of interest in a case where it is seen from each camera belonging to the first and second camera groups. In a case where the determination results indicate that the three-dimensional model of the object of interest is visible, the processing advances to S809. On the other hand, in a case where the three-dimensional model is not visible, the rendering is not necessary for the object, and therefore, the processing advances to S814 to process the next object. FIG. 10 is a table that puts together the results of the visibility determination and the results of the depth of field determination in a case where it is assumed that the shape of the player 201 located at the center of the field in FIG. 2 is the regular prism object 600 shown in FIG. 6. Here, it is assumed that the surface including the segment connecting the representative points 606 and 607 in the object 600 as the three-dimensional model of the player 201 is seen from the front of the camera 111a. In the table in FIG. 10, "1" in an item "VISIBILITY" indicates that the three-dimensional model is visible and "0" indicates that the three-dimensional model is not visible. Further, "1" in an item "DEPTH OF FIELD" indicates that the three-dimensional model is within the depth of field and "0" indicate that the three-dimensional model is outside the depth of field. By putting together the information on the visibility and the depth of field from each camera for each point constituting the three-dimensional model as described above, it is made possible to easily specify visible/invisible and within/outside the depth of field for each point constituting the three-dimensional model.

At S809, the virtual viewpoint image generation unit 506 performs the rendering processing to determine a color of the three-dimensional model of the object of interest, which is generated at S802, based on the virtual viewpoint information provided by the control device 118. At this step also, as at S806, the three-dimensional model based on the first camera group is taken as a target. What is different from S806 is that the captured image by the second camera group, for which it has been determined that the object of interest exists within the depth of field at S804, is used preferentially at the time of determining a color of each point determined to be visible. In a case where priority of use is determined, it is possible to refer to the table in FIG. 10 described above. For the point (voxel) for which it has been determined that the point is visible only from the camera of the first camera group, the determining a color is performed by using the captured image of the first camera group. By preferentially using the captured image by the second camera group that performs image capturing at a position closer to the object and in which the object of interest exists within the depth of field for the coloring, a virtual viewpoint image that represents the color of the object more accurately is obtained.

At S810, the three-dimensional model generation unit 502 generates the three-dimensional model of the object, such as the player, based on the captured image data of the second camera group that performs image capturing at a distance close to the player or the like and the camera parameters of each camera belonging to the second camera group. However, among the captured image data of the second camera group, the captured image data that is used at the time of generation is the image data captured by the camera of the second camera group, for which it has been determined that the object of interest exists within the depth of field at S804. By using the captured image of the second camera group that performs image capturing at a position closer to the object, a finer three-dimensional model is obtained.

At S811, the distance estimation unit 503 generates distance information by estimating the distance from each point constituting the three-dimensional model to each camera belonging to the second camera group for the three-dimensional model of the object of interest, which is generated at S810. However, among each camera belonging to the second camera group, the camera that is used at the time of distance estimation is the camera for which it has been determined that the object of interest exists within the depth of field at S804.

At S812, the visibility determination unit 504 determines the visibility of the three-dimensional model of the object of interest, which is generated at S810, in a case where the three-dimensional model is seen from each camera belonging to the second camera group. However, as at S811, the camera that is used at the time of visibility determination is the camera for which it has been determined that the object of interest exists within the depth of field at S804, among each camera belonging to the second camera group. In a case where the determination results indicate that the three-dimensional model of the object of interest is visible, the processing advances to S813. On the other hand, in a case where the three-dimensional model is not visible, the rendering is not necessary for the object, and therefore, the processing advances to S814 to process the next object.

At S813, the virtual viewpoint image generation unit 506 performs the rendering processing to color the three-dimensional model of the object of interest, which is generated at S810, based on the virtual viewpoint information provided by the control device 118. At this step, different from S806 and S809 described above, the three-dimensional model based on the second camera group is taken as a target. Then, as at S809, as the captured image that is used for determining a color to each point determined to be visible, the captured image by the camera of the second camera group, for which it has been determined that the object of interest exists within the depth of field at S804, is used preferentially. In the determining a color by preferentially using the captured image of the second camera group, a virtual viewpoint image of a high image quality, which represents a fine three-dimensional model in the accurate color, is obtained.

At S814, whether or not the processing is completed for all the objects is determined. In a case where there is an unprocessed object, the processing returns to S804, and the processing is continued by determining the next object of interest. On the other hand, in a case where the processing is completed for all the objects, this processing is terminated.

The above is the flow of the virtual viewpoint image generation processing according to the present embodiment. In the rendering processing at S806, S809, and S813, the point (voxel) that is actually the target of coloring is the point that remains finally by the occlusion determination between objects among the points determined to be visible. Further, in the present embodiment, the camera parameters of the camera 111k to 111t that include the entire field in the image capturing range are used to specify the position of the object in the image capturing-target space, but the present embodiment is not limited to this. For example, it may also be possible to specify the position of an object by a method other than the distance estimation by causing a player or the like to carry a device mounting the GPS function.

As above, according to the present embodiment, it is made possible to use only the captured image of the camera, in which an object is included in the depth of field thereof, for generation and coloring of a three-dimensional model, and therefore, it is possible to generate a virtual viewpoint image of a higher image quality.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to appropriately perform processing relating to shape data representing a three-dimensional shape of an object.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-006356, filed Jan. 19, 2021 which is hereby incorporated by reference wherein in its entirety.

What is claimed is:

1. An information processing apparatus comprising:
one or more memories storing instructions; and
one or more processors executing the instructions to:
obtain three-dimensional shape data on an object generated based on a plurality of captured images captured by a plurality of imaging devices;
after obtaining the three-dimensional shape data, based on the three-dimensional shape data, calculate a first distance which represents a distance from a specific imaging device among the plurality of imaging devices to an element that forms the three-dimensional shape data;
perform a first determination in which it is determined that the element is within a depth of field of the specific imaging device in a case where the calculated first distance is equal to or greater than a second distance and equal to or less than a third distance, and it is determined that the element is not within the depth of field of the specific imaging device in a case where the first distance is less than the second distance or greater than the third distance;
wherein the depth of field is defined by two boundaries, the second distance is a distance from the specific imaging device to a first boundary of the two boundaries closer to the specific imaging device, and the third distance is a distance from the specific imaging device to a second boundary of the two boundaries farther from the specific imaging device, and
wherein in a case where it is determined in the first determination that the element is within the depth of field of the specific imaging device, perform a second determination in which it is determined whether the element is visible from the specific imaging device, and in a case where it is determined in the first determination that the element is not within the depth of field of the specific imaging device, prevent performing the second determination; and
generate, based on a result of the first determination and a result of the second determination, information used to generate color information on a virtual viewpoint image.

2. The information processing apparatus according to claim 1, wherein
in a case where a position of the element in three-dimensional space is within a three-dimensional area corresponding to the depth of field of the specific imaging device, it is determined that the element is within the depth of field of the specific imaging device, and in a case where the position of the element in the three-dimensional space is not within the three-dimensional area corresponding to the depth of field of the specific imaging device, it is determined that the element is not within the depth of field of the specific imaging device.

3. The information processing apparatus according to claim 1, wherein
the information used to generate the virtual viewpoint image is information indicating that the element is visible or invisible from the specific imaging device.

4. The information processing apparatus according to claim 1, wherein
the three-dimensional shape data on the object is a point cloud, and
the element is a point included in the point cloud.

5. The information processing apparatus according to claim 1, wherein
in a case where a difference between a distance value indicating a distance from the specific imaging device to the element and a distance value from the specific imaging device to center coordinates of the object is less than a threshold value, it is determined that the element is visible from the specific imaging device, and
in a case where the difference between the distance value indicating the distance from the specific imaging device to the element and the distance value from the specific imaging device to the center coordinates of the object is larger than or equal to the threshold value, it is determined that the element is invisible from the specific imaging device.

6. The information processing apparatus according to claim 1, wherein
the virtual viewpoint image is generated based on the plurality of captured images obtained from the plurality of imaging devices to generate a texture corresponding to the element of the three-dimensional shape data in the virtual viewpoint image based on a captured image obtained from an imaging device from which the element is determined to be visible.

7. An information processing method comprising:
obtaining three-dimensional shape data on an object generated based on a plurality of captured images captured by a plurality of imaging devices;
after obtaining the three-dimensional shape data, based on the three-dimensional shape data, calculating a first distance which represents a distance from a specific imaging device among the plurality of imaging devices to an element that forms the three-dimensional shape data;
performing a first determination in which it is determined that the element is within a depth of field of the specific imaging device in a case where the calculated first distance is equal to or greater than a second distance and equal to or less than a third distance, and it is determined that the element is not within the depth of field of the specific imaging device in a case where the first distance is less than the second distance or greater than the third distance;
wherein the depth of field is defined by two boundaries, the second distance is a distance from the specific imaging device to a first boundary of the two boundaries closer to the specific imaging device, and the third distance is a distance from the specific imaging device to a second boundary of the two boundaries farther from the specific imaging device, and
wherein in a case where it is determined in the first determination that the element is within the depth of field of the specific imaging device, performing a second determination in which it is determined whether the element is visible from the specific imaging device, and in a case where it is determined in the first determination that the element is not within the depth of field of the specific imaging device, prevent performing the second determination; and
generating, based on a result of the first determination and a result of the second determination, information used to generate color information on a virtual viewpoint image.

8. A non-transitory computer readable storage medium storing a program that, when executed by a computer, causes the computer to perform an information processing method comprising:

obtaining three-dimensional shape data on an object generated based on a plurality of captured images captured by a plurality of imaging devices;

after obtaining the three-dimensional shape data, based on the three-dimensional shape data, calculating a first distance which represents a distance from a specific imaging device among the plurality of imaging devices to an element that forms the three-dimensional shape data;

performing a first determination in which it is determined that the element is within a depth of field of the specific imaging device in a case where the calculated first distance is equal to or greater than a second distance and equal to or less than a third distance, and it is determined that the element is not within the depth of field of the specific imaging device in a case where the first distance is less than the second distance or greater than the third distance;

wherein the depth of field is defined by two boundaries, the second distance is a distance from the specific imaging device to a first boundary of the two boundaries closer to the specific imaging device, and the third distance is a distance from the specific imaging device to a second boundary of the two boundaries farther from the specific imaging device, and wherein in a case where it is determined in the first determination that the element is within the depth of field of the specific imaging device, performing a second determination in which it is determined whether the element is visible from the specific imaging device, and in a case where it is determined in the first determination that the element is not within the depth of field of the specific imaging device, the second determination is not performed; and generating, based on a result of the first determination and a result of the second determination, information used to generate color information on a virtual viewpoint image.

\* \* \* \* \*